Jan. 1, 1929.
R. R. WARE
ROLLER
Filed April 30, 1927
1,697,485
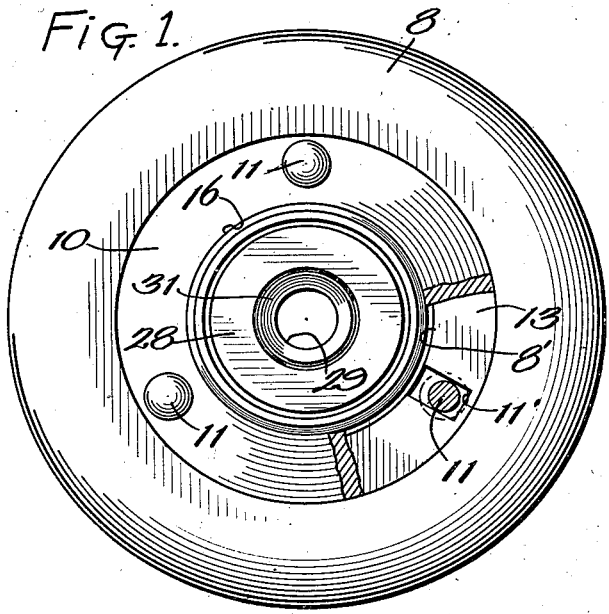
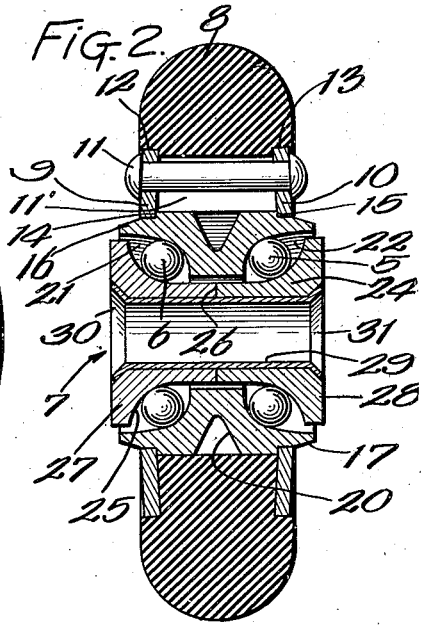
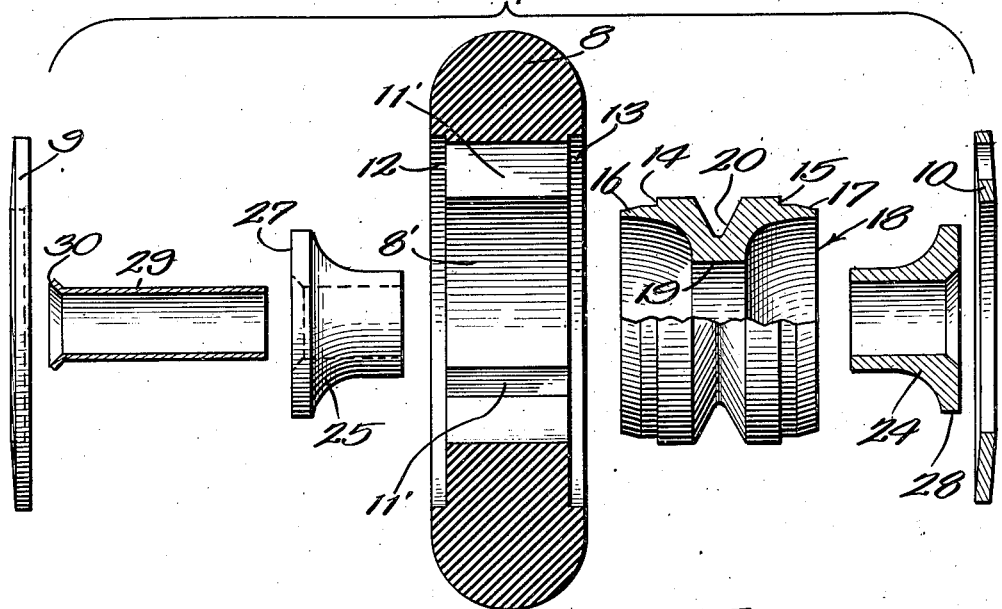
INVENTOR
ROBERT R. WARE
By Cheever & Cox
ATTY'S Patented Jan. 1, 1929.

1,697,485

UNITED STATES PATENT OFFICE.

ROBERT R. WARE, OF CHICAGO, ILLINOIS, ASSIGNOR TO CHICAGO ROLLER SKATE COMPANY, OF CHICAGO, ILLINOIS, A CORPORATION OF ILLINOIS.

ROLLER.

Application filed April 30, 1927. Serial No. 187,811.

This invention relates in general to rollers of the anti-friction type and has particular reference to a roller assembly devised especially for skates. The primary object of the invention is to provide a roller of the character described which is suited for quantity production; which embodies a minimum number of parts; and which may be conveniently assembled in the first instance and later disassembled for repair should the occasion arise, as for instance in replacing the bearing members or other parts.

Other objects and features of the assembly and parts thereof will be described as the description now proceeds with reference to the accompanying drawing which has been selected to illustrate a practical embodiment of the roller.

In the drawing Figure 1 is a view in side elevation of a roller embodying the invention.

Figure 2 is a view in cross section through the roller; and

Figure 3 is a schematic view collectively showing the main parts of the construction.

In skates primarily intended for children a single ball race is usually sufficient, but for adults, or for that matter anyone weighing seventy pounds or more a single ball race does not always serve to the best advantage. The roller embraced by the present invention is intended for adult skates and for this reason comprises two adjacent sets of anti-friction bearings, preferably ball bearings as shown at 5 and 6. It is important that the two sets of bearings be arranged concentric and also on opposite sides of a plane intersecting the axis of the hub structure 7 and the tread 8. This arrangement transmits and distributes all shocks and pressures from the tread 8 to the hub 7 equally through those parts of the roller which are most capable of accommodating the resultant stresses. This feature will be readily recognized as the description proceeds. The tread 8 comprises a relatively tough vulcanized rubber tire properly rounded so that the tread per se has a relatively narrow contact upon the skating surface. While the material of the tire has little, if anything, to do with the invention it should be explained that it has certain inherent resilient qualities but not sufficiently soft to absorb all shocks and abnormal pressure. If such were the case the tire would be much too soft to have the required lasting qualities.

The tire or tread is mounted to the roller by opposed annular plates 9 and 10 which are securely clamped together by a series of rivets or the like 11. In this connection the plates are countersunk, so to speak, in the tire sides by providing an annular recess as at 12 and 13 on opposite sides of the tire. The opposite edge of the plates rest or seat in similar annular recesses or notches 14 and 15 on the arch portions 16 and 17 of a one-piece bushing 18. The tire is made with a central opening 8' within the reduced thickness made by the countersunk recesses 12 and 13 and the material of this reduced thickness is slotted as at 11' at spaced intervals to accommodate the rivets 11. The arch portions 16 and 17 of the bushing 18 are divided or spaced by an internal annular ring like part 19 formed not only as a spacer but also to enable an external V-shaped groove 20 to be machined or otherwise made in the circumference of the bushing between the arches.

The bushing 18 fits within the central opening in the tire and encircles the hub structure 7 and cooperates therewith to provide a pair of spaced raceways 21 and 22 for the two sets of concentric ball bearings 5 and 6 which are thus grouped around the hub to reduce friction to a minimum. The hub 7 is made up by a pair of modified cone-like parts arranged end to end as at 26 so that their larger flanged ends 27 and 28 enclose or at least block the sides of the raceways and confine the bearings therein. The cone-like parts are secured together by a seamless tubing 29 which is passed through the cones with its opposite ends swedged over the flared shoulders of the cones as at 30 and 31.

As illustrated to advantage in Figure 3 the parts may be assembled as shown or in any other suitable order.

Particular attention is invited to the position of the plates 9 and 10 which bear upon the arch portions of the bushing. Any and all shocks imparted to the tread and not absorbed by the material of the tire will be transmitted to the arches through the non-resilient plates and also direct through the material of the tire to the bushing since the central opening in the tire seats on the annular surfaces between the V-shaped groove 20 and each of the plates. With the weakened area, or perhaps it would be more appropriate to say a less rigid intermediate area on the bushing, developed by the annular groove 20 the bushing is afforded an opportunity to absorb some of the shock when obstructions are met with. This will thus lend a cushioning effect which of course is highly desirable.

The concentric ball bearing arrangement prevents wabbling of the roller so that the assembly as a whole provides a very practical and unusually effective construction at a comparatively cheap production cost considering the few parts and ease of assembly.

Having thus described my invention what I claim as new and desire to secure by Letters Patent is:

1. In a ball bearing roller a tread, a hub, concentric roller bearings grouped around the hub on opposite sides of a central plane intersecting the axis of the hub and tread, and an outer race member for the ball bearings having a yieldable intermediate portion between said bearings adapted to yield in response to shocks experienced by the tread.

2. A roller comprising a hub structure, a tread, two sets of adjacent anti-friction bearings grouped around the hub structure and resilient means bearing on said bearings and constructed to yield intermediate thereof upon the application of pressure to the tread and thereby absorb the shocks which may be experienced by the tread.

3. A roller comprising a hub structure, a tread, two sets of concentric anti-friction bearings grouped around the hub structure and yielding shock-absorbing means confining the bearings in the roller, said means having a yieldable intermediate portion adapted to respond to shocks experienced by the tread.

4. A roller comprising a hub structure providing the inner part of a raceway for anti-friction bearings, and a yielding shock-absorbing member providing the outer part of the raceway for said bearings, said member being formed with an intermediate yieldable portion.

5. In a roller bearing, a hub structure, a tread, inner and outer members providing concentric raceways for two sets of adjacent roller bearings, said outer member having a resilient portion between the raceways constructed to yield upon the application of pressure to the tread.

6. In a roller bearing, a hub structure, a tread, adjacent raceways for concentric roller bearings on the hub structure, and a one-piece member bearing on the roller bearings in the raceways having an intermediate annular area constructed to yield upon the application of pressure to the tread.

7. In a ball bearing roller, a tread, a hub structure, said hub structure providing the inner parts of raceways for two sets of adjacent ball bearings, and a member having spaced arch portions providing the outer parts of the raceways for said bearings, said member having an annular inner ringlike portion dividing the raceways into separated confines for the bearings, and a yieldable annular area in its circumference between said bearings.

8. In a ball bearing roller, a tread, a hub structure, opposed plates for mounting the tread on the roller, a one piece bushing between said opposed plates and the hub structure having an intermediate yieldable portion, and spaced concentric ball bearings between the bushing and hub structure.

9. In a ball bearing roller, a tread, a hub structure, opposed plates for mounting the tread on the roller, a one piece bushing between said opposed plates and the hub structure, and spaced concentric ball bearings between the bushing and hub structure, said bushing having divided arch portions bearing on the ball bearings and a portion between said arch portions constructed to yield upon the application of pressure to the tread.

10. In a ball bearing roller, a hub structure, a bushing having arch portions cooperating with the hub structure to provide concentric raceways, ball bearings in said raceways, opposed plates bearing on the arch portions of the bushing for mounting said tread, and a yieldable area in the bushing between the arches thereof constructed to yield upon the application of pressure to said tread.

11. In a ball bearing roller, a hub structure, a one piece cylindrical bushing having divided arch portions cooperating with the hub structure to provide two sets of adjacent raceways, concentric ball bearings in said raceways, a tread for the roller, opposed plates bearing on the arch portions of the bushing for mounting said tread, and an annular groove on the bushing intermediate the arch portions thereof providing a yieldable area constructed to yield upon the application of pressure to said tread.

12. In a ball bearing roller, a hub structure, a one piece cylindrical bushing having divided arch portions cooperating with the hub structure to provide two sets of adjacent raceways, concentric ball bearings in said raceways, a tread for the roller, opposed plates bearing on the arch portions of the bushing for mounting said tread, and an annular groove on the bushing intermediate the arch portions thereof providing a yieldable area constructed to yield upon the application of pressure to said tread, said hub structure comprising a pair of cone-like members, and means for joining said members with their ends in abutting relation.

13. In a ball bearing roller, a hub structure, a one piece cylindrical bushing having divided arch portions cooperating with the hub structure to provide two sets of adjacent raceways, concentric ball bearings in said raceways, a tread for the roller, opposed plates bearing on the arch portions of the bushing for mounting said tread, and an annular groove on the bushing intermediate the arch portions thereof providing a yieldable area constructed to yield upon the application of pressure to said tread, said hub structure comprising a pair of cone-like members, and means for joining said members with their ends in abutting relation comprising a tube extending through said members with its opposite ends swedged over the outer ends of the cone-like members.

14. In a ball bearing roller. a tread, a hub, concentric roller bearings grouped around the hub on opposite sides of a central plane intersecting the axis of the hub and tread, and an outer race member for the ball bearings having a yieldable intermediate portion between said bearings, said portion being adapted to yield in response to shocks experienced by the tread, the forces of which are imparted to the portion of the outer race member between the concentric bearings.

15. In a roller bearing, a hub structure, a tread, adjacent raceways for concentric roller bearings on the hub structure, and a one-piece member bearing on the roller bearings in the raceways having an intermediate annular area constructed to yield in response to shocks experienced by the tread, the effects of which are imparted to the portion of the one-piece member between the concentric roller bearings.

In witness whereof, I have hereunto subscribed my name.

ROBERT R. WARE.